United States Patent [19]

Melchior

[11] Patent Number: 4,794,848

[45] Date of Patent: Jan. 3, 1989

[54] ANTI-SEIZING DESIGN FOR CIRCUMFERENTIALLY CONTINUOUS PISTON RING

[76] Inventor: Jean F. Melchior, 126 Bld du Montparnasse, 75 014 Paris, France

[21] Appl. No.: 71,915

[22] Filed: Jul. 10, 1987

[30] Foreign Application Priority Data

Aug. 18, 1986 [FR] France ................. 86 11801

[51] Int. Cl.$^4$ ............ F16J 1/02; F16J 1/08; F16J 9/12; F16J 9/26
[52] U.S. Cl. ........................ 92/159; 92/160; 92/208
[58] Field of Search ............ 92/153, 158, 159, 160, 92/174, 187, 192, 208; 123/193 P

[56] References Cited

U.S. PATENT DOCUMENTS

| | | | |
|---|---|---|---|
| 1,474,354 | 11/1923 | Franchi | 92/192 X |
| 1,709,316 | 4/1929 | Lord | 92/187 X |
| 2,438,243 | 3/1948 | Zoromskis | 92/192 X |
| 4,050,360 | 9/1977 | Powers et al. | 92/187 X |
| 4,535,682 | 8/1985 | Collyear et al. | 92/158 X |
| 4,599,935 | 7/1986 | Ellerman et al. | 92/208 X |

FOREIGN PATENT DOCUMENTS

| | | | |
|---|---|---|---|
| 153666 | 9/1985 | European Pat. Off. | 123/193 P |
| 707660 | 7/1931 | France . | |

Primary Examiner—Robert E. Garrett
Assistant Examiner—George Kapsalas
Attorney, Agent, or Firm—Larson and Taylor

[57] ABSTRACT

A continuous ring with inside diameter ($D_{in}^R$) larger than the outside diameter ($D_{out}^R$) of the piston irrespective of conditions of operation. The ring's outside diameter when measured outside the cylinder equals or slightly exceeds the inside diameter of the cylinder. The ring is sized and designed according to various parameters determined so as to prevent piston seizing in the cylinder.

19 Claims, 4 Drawing Sheets

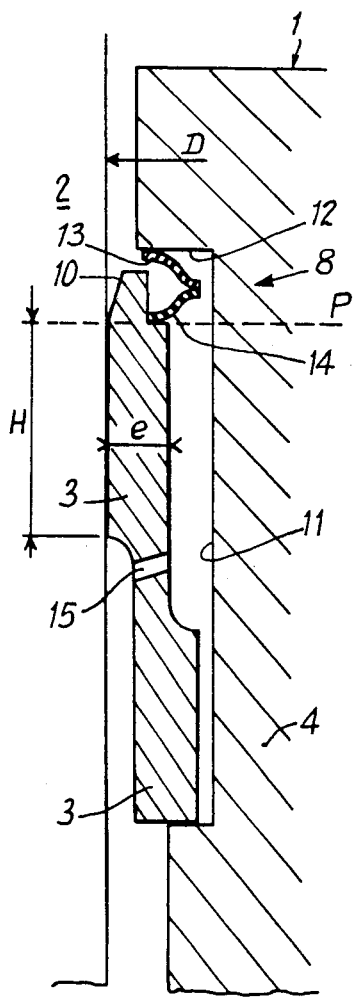
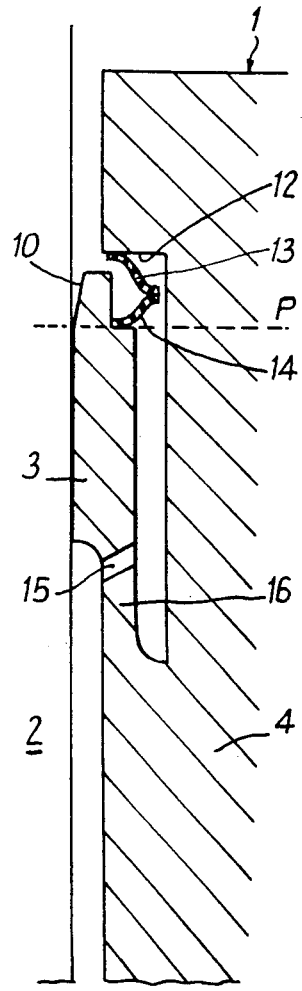
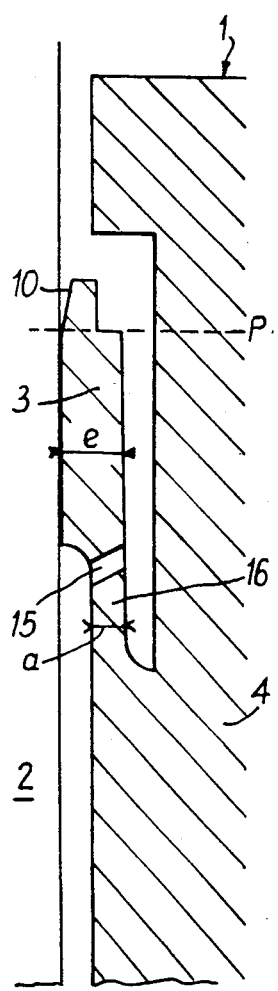

ANTI-SEIZING DESIGN FOR CIRCUMFERENTIALLY CONTINUOUS PISTON RING

BACKGROUND OF THE INVENTION

1. Field of the Invention

The invention relates to pistons for reciprocating machines employing a compression of a gaseous fluid, such as internal or external combustion engines and compressors, i.e. for machines in which the working gas is at both high pressure and high temperature.

2. Field of the Invention

The engines, these engines may be of various types, such as compression ignition or controlled ignition engines; two-stroke engines (in particular effecting a scavenging through a valve), four-stroke or other engines; engines having a free piston or a piston connected to a crankshaft or other mechanism; engines having a pressurized or non-pressurized crankcase; in the case of connected piston, the latter may be pivotally connected to a connecting rod directly or indirectly (by a crosshead), the pivotal connection being for example cylindrical (by means of a piston pin which is or is not journalled in a boss) or spherical.

In these machines, the seal between the working chamber and the chamber located on the other side of the piston (for example the crankshaft case) is usually achieved by metal rings whose outer surface intimately fits the inside wall of the cylinder so as to constitute a lubricated contact and thereby avoid seizing and limit wear.

The difficulties of this solution are the following:

(1) It is not possible to avoid transient differences of temperature between the inner wall of the cylinder, the ring and the piston, of several tens of degrees (centigrade) which result in differential expansions of several tenths of a millimeter, much greater than the thickness of the film of oil which is measured in microns. There are added to the differences in diameter due to the differential thermal expansion, when the cylinders are lined, those due to the expansion of the relatively thin liner of the cylinder under the effect of the pressure of the working gas. This is why it is necessary, as is known, to split the ring (except in exceptional cases such as mentioned in FR-A-707.660 which will be discussed hereinafter) and allow it freedom of movement in the groove of the piston, the outside diameter of the latter being always less than the inside diameter of the cylinder.

(2) In the neighborhood of the top dead center (the combustion top dead center in the case of internal combustion engines) where the pressure and temperature are maximum in the working chamber, the velocity of the ring and the hydrodynamic supporting qualities of the film of oil are low. The ring is then applied against the inner wall of the cylinder and the residual oil is then urged upwardly (if it is assumed conventionally that the working chamber is located above the piston) and downwardly to tee point of resulting in metal-to-metal contact which causes wear of the upper end of the cylinder and ring. The best solution for retarding the disappearance of the film of oil would be to increase the height of the ring and therefore the volume of oil trapped for an identical escape section, but this is difficult to achieve owing to the cyclic tilting undergone by the piston around its axis of connection with the connecting rod and which leads to giving the ring a convex curved shape so as to maintain a circular contact on the inner wall of the cylinder and a good bearing of the ring on the lower side of the groove of the piston. The drawback of this solution is that it results in specific contact pressures which may reach several hundreds of bars, bearing in mind the pressure-sealed operation of the ring. One is therefore obliged to pass through the top dead center with a more or less limited unctuous lubrication condition of operation, the oil being maintained on the inner wall of the cylinder in grooves which are usually helical and provided by a treatment of the wall currently termed "honing".

Furthermore, the splitting of the ring allows a passage of burning hot gases along the piston (phenomenon termed "blow-by"), resulting in pollution of the lubricating oil and heating of the piston-cylinder interface; further, it results in a more or less rapid wear of the top of the cylinder owing to the disappearance of the film of oil and the introduction of abrasive particles. It must be added that, in order to be free in its groove, the metal ring beats at a certain moment of the cycle, i.e. passes form a bearing against the lower side of the groove to a bearing against the upper side of the latter. It then liberates a gas passage through the inner end of the groove which entrains the oil toward the combustion chamber when the pressure between the rings is higher than the pressure in this chamber, which increases the oil consumption.

It is known that a piston performs different functions:

(a) transmission to a connecting rod of the force due to the thrust of the gases which is exerted either solely on the upper side of the piston, or also on its lower side (double-acting pistons or pistons of engines having a pressurized crankcase) in the case of internal combustion engines, or transmission in the opposite direction in the case of compressors;

(b) guiding of the piston in the cylinder (or the liner of the latter) in which it moves in accordance with a quasi-rectilinear reciprocating motion and the taking of the lateral reaction of the cylinder (or liner);

(c) sealing between the chambers located on each side of the piston in which necessarily different pressures prevail;

(d) limitation of the oil flow from one side of the piston to the other.

Owing to mechanical frictions associated with the sliding of the piston in the cylinder, the transfer of heat between the gases and the wall of the cylinder, due to the heating of the gases during the compression or the combustion, and the usually intense cooling of the cylinder, a temperature difference $\Delta T$ occurs between the piston and the liner.

This difference $\Delta T$ is variable:
  according to the position of the considered point
  piston top, piston bottom;
  situation with respect to the boss of the piston;
  according to the conditions of operation of the machine:
    stoppage;
    cold or hot;
  according to the speed and/or the load of the machine.

Therefore, an operational clearance is usually provided between the piston and the cylinder in order to avoid or limit any gripping of the piston in the cylinder upon differential thermal expansions.

This operational clearance is obtained in a practically uniform manner by giving to the piston a complex shape in the cold state:
  barrel profile of the piston
  oval section (due to the boss),
which increases the complexity and the cost of the piston and precludes an intimate contact between the piston and the cylinder (and consequently an undesirable concentration of the contact pressure).

The existence of this clearance on one hand results in a defect in the guiding which results in non-rectilinear movements of the piston (tilting, whipping, etc.). For example, when the piston is directly pivotally connected to a connecting rod, the angulation of the latter results in a cyclic tilting of the piston. The existence of this clearance on the other hand results in intense noise, shocks, wear and fatigue.

These non-rectilinear movements of the piston require locating the piston rings close to the upper side of the piston in order to avoid contact of the head of the piston with the cylinder (or liner). Consequently, the piston ring means are located in the hottest part of the piston and the lubricated path of the cylinder is less protected from the hot gases.

These non-rectilinear movements of the piston also require a convex curved profile on the rings in order to maintain the continuity of the circle of contact between the ring and the cylinder. This results in an increase in the specific pressure of contact between the rings and the cylinder.

Around the top dead center (TDC) where the sliding velocity of the piston is insufficient to maintain a hydrodynamic pressure in the film of oil, while the bearing pressure of the ring is maximum due to the increase in the pressure of the gases the thickness of the protective film of oil becomes too small or nil and results in wear of the cylinder (or of the liner) and wear of the ring.

The required movement of the ring in its groove results in the floating of the ring when it changes its bearing against one side of the groove to the other, resulting in movements of gas and oil.

The splitting of the rings required for adapting at each instant the perimeter of tee ring to that of the cylinder, also results in movements of gas and oil.

In particular, and as recalled hereinbefore, a very harmful gaseous flow (blow-by) occurs between the upper side and the lower side—adjacent to the crankcase—of the piston. This flow results in:
  an intense heating of the top of the piston and the cylinder;
  pollution and oxidation of the oil;
  the entraining of abrasive particles of carbon or soot or ash resulting in scratching on the cylinder (or the liner) and the outer surface of the ring;
  the gumming—by destruction of the oil—of the ring in its groove resulting in its immobilization and increasing the sealing defect and eventually causing the seizing of the piston in the cylinder.

SUMMARY OF THE INVENTION

These facts having been recalled, the main object of the invention is to permit the movement of the piston in the cylinder with no possibility of seizing.

The invention therefore provides a piston for reciprocating machines employing a compression of gaseous fluid, such as internal or external combustion engines and compressors, which is adapted to slide in a cylinder and which carries at least one solid, preferably metallic, ring of revolution which is continuous—i.e. without a split and whose exterior surface is cylindrical at least in a part H of its height, and has a generatrix parallel to the axis of the piston, whose inside diameter $D_r^i$ is greater than the outside diameter $D^b{}_o$ of the piston body at least at any point of the height H of the cylindrical bearing surface confronting it, irrespective of the conditions of operation of the piston, and which includes means for supplying lubricating oil coming from a sump, wherein:

a—the ring, when not mounted in the cylinder and having the same temperature as the latter, has an outside diameter at least equal to, and preferably slightly greater than, the inside diameter of the cylinder in a ratio substantially equal to 1.001;

b—the ratio t/D of the maximum thickness t of the ring relative to its diameter D is, at every point of said height H, at the most equal to a limit $K = P_{lim}/2\sigma_{el}$ where $P_{lim}$ is the minimum pressure of contact of the ring against the cylinder above which seizing may occur and $\sigma_{el}$ is the elastic limit of the material from which the ring is made;

c—the ring is connected to the body of the piston by means which are so arranged that they cannot in any case induce in operation, between the ring and the cylinder, a pressure of contact exceeding $P_{lim}$; and d—the height H is sufficient to ensure that there can be established in operation, between the ring and the cylinder, a hydrodynamic pressure permitting the creation therein of a sufficiently thick film of oil.

The aforementioned feature (b) involves the pressure of contact between the ring and the cylinder. This pressure may be determined in the following way.

It can be shown (see FIG. 1) that the integral of the forces of reaction of the sleeve against the semiring is equal to:

$$F = P \cdot D \cdot x,$$

x being the height of the considered cylinder section and
P being the pressure at which the ring bears against the cylinder.

This force F is equal to the resultant of the compression stresses of the ring;

$$F = 2f = 2 \cdot \sigma \cdot (t \cdot x)$$

$\sigma$ being the compression stress,
whence $$P = 2 \cdot \frac{t}{D} \cdot \sigma \tag{1}$$

The compression stress $\sigma$ of the ring may result from: (a) an initial tightness of the ring in the bore of the cylinder or (b) a differential thermal expansion between the ring and the cylinder:

a—If the ring is mounted to be tight in the cylinder, i.e. if the outside diameter of the non-mounted ring $(D_R^{out})_o$ is greater than the inside diameter of the cylinder $D_c^{in}$ (diameter which will be assumed to be invariable hereinafter in order to simplify the description), in the ratio:

$$\frac{(D_R^{out})_o}{D_c^{in}} = 1 + s,$$

s being the tightness.

If this ring is a force fit in the cylinder, it will be subjected to a compression stress:

$$\sigma_o = E \cdot s,$$

E being the Young's modulus of the material of the ring (namely about 22,000 hbars for steel).

b—If the ring undergoes a differential heating of amplitude ΔT, with respect to the cylinder, this heating would produce, if the ring were free (not mounted in the cylinder), a linear expansion:

$$\frac{\Delta l}{l} = \epsilon \cdot \Delta T$$

in which $\epsilon$ is the coefficient of thermal expansion of the material of the ring ($o \simeq 10^{-5}(K)^{-1}$ for steel. If this expansion is contained by the cylinder (or the cooled liner), the latter will compress the ring and result in an increase in the compression stress (neglecting any deformation of the cylinder):

$$\Delta \sigma = E \cdot \epsilon \cdot \Delta T.$$

Finally, the compression stress of the ring in operation will be:

$$\sigma = \sigma_o + \Delta \sigma = E \cdot (s + \epsilon \cdot \Delta T). \quad (1)$$

According to the invention, the relative thickness t/D, in which t is the thickness of the ring and D the diameter of the bore, must be chosen in accordance with the material of the ring and its elastic limit on one hand and in accordance with the rubbing pair ring-cylinder and its aptitude for seizing on the other hand.

The elastic limit is the stress $\sigma_{el}$ above which the deformation is no longer reversible.

The aptitude for seizing of the rubbing pair ring-cylinder is characterized by the limit pressure $P_{lim}$ of the bearing of the ring against the cylinder above which seizing may occur.

A better understanding of the mechanism of the non-seizing ring may be had from the following analysis illustrated by the diagram of operation of FIG. 2. This diagram is double. In its right part there are shown, as abscissae, the differential heating ΔT and, as ordinates, the compression stress $\sigma$ of the ring according to the expression of equation (2). In its left part, there are shown, as ordinates, the same value of the compression stress and, as abscissae, the resulting value of the pressure of the bearing of the ring against the cylinder in accordance with the expression of the equation (1).

Two typical cases will be analyzed.

A—The ring is too thick.

Let it be assumed that the ring having an outside diameter D=135 mm is mounted with an initial tightness of 1 per 1,000, namely s=0.001.

Let it be assumed that the elastic limit of the material of the ring is $\sigma_{el}$=100 hbars and that the limit bearing pressure without seizure of the ring on the cylinder, namely $P_{lim}$=500 bars.

The initial stress of the ring mounted in the cylinder will be:

$$\sigma_s = 22,000 \times 0.001 = 22 \text{ hbars}.$$

In operation, with a differential heating ΔT=50° C, the stress will rise to:

$$\sigma = 22,000 \times (0.001 + 50 \cdot 10) = 33 \text{ hbars}.$$

The ring operates within the elastic deformation range ($\sigma$<100 hbars).

A-1—Let it be assumed that the ring has a correct dimension; e=2.5 mm, whence $$\frac{t}{D} = 0.0185 \simeq \frac{P_{lim}}{2\sigma_{el}} = 0.025.$$

The initial bearing pressure is:

$$P_o = 2 \times 0.0185 \times 2,200 = 81 \text{ bars}$$

and, in operation:

$$P = 2 \times 0.0185 \times 3,300 = 122 \text{ bars}.$$

No seizure will occur (P=500 bars).

If an abnormal heating accidentally occurred between the ring and the cylinder:
ΔT=400° C.,
the compression stress will change to $$\sigma = 22,000 \, (0.001 + 400 \cdot 10^{-5}) = 110 \text{ hbars},$$

i.e. a value higher than the elastic limit. In practice, the stress will be saturated at the value $\sigma_{el}$=100 hbars.

Consequently, the corresponding bearing pressure will be limited to:

$$P \leq 2 \cdot 0.0185 \cdot 10,000 = 370 \text{ bars}$$

at which no seizing will occur. However, the ring will have forged itself into the cylinder.

Upon return to stoppage (ΔT=0), the residual stress will be:

$$\sigma_o' = 100 - (22,000 \times 400 \cdot 10^{-5}) = 12 \text{ hbars}$$

corresponding to a tightness:

$$S' = 12/22000 = 0.00055.$$

The ring will have behaved as a fuse in an electric installation without alteration of the ring-cylinder contact.

A-2—If on the other hand the ring is too thick:

$$\frac{t}{D} = 0.1 > \frac{P_{lim}}{2\sigma_{el}} = 0.025.$$

The initial bearing pressure will be
$$P_o = 2 \cdot 0.1 \cdot 2,200 = 440 \text{ bars}.$$

But, as soon as operation starts (ΔT=50° C), this pressure will rise to:

$$P_o = 2 \times 0.1 \times 3,300 = 660 \text{ bars},$$

causing the seizing which in turn will immediately increase the heating ΔT, aggravating the phenomenon: this divergent procedure will result in the rapid destruction of the ring-cylinder pair.

B—The ring is mounted too tight.

Let it be assumed that the ring has a correct thickness:

$t/D = 0.0185$ but is mounted too tight:

$s = 0.004.$

The initial compression stress is:

$\sigma_0 = 22,000 \times 0.004 = 88 \text{ hbars}.$

Corresponding to this initial stress is an initial bearing pressure:

$P_0 = 2 \times 0.0185 \times 8,800 = 326 \text{ bars}.$

This high pressure, although it is lower than the limit pressure at which seizing may occur, will produce great heating of the ring. If for example $\Delta T = 100°$ C., the compression stress will reach $\sigma = 22,000(0.004 + 100 \times 10) = 110 \text{ hbars},$ i.e. will exceed the elastic limit of 100 hbars.

In fact, the ring will forge itself into the bore of the cylinder and, upon return to stoppage ($\Delta T = 0°$ C.), the compression stress will drop to:

$\sigma = 100 - (22,000 \cdot 100 \cdot 10^{-5}) = 78 \text{ hbars}$ corresponding to a tightness of $s = 78/22000 = 0.0035.$ There will be observed in this typical case a non-divergent procedure which protects the ring-cylinder pair from any seizing.

The choice of the relative thickness t/D and of the pre-tightening s of the ring depends on the elastic limit of the material of the ring.

A "thin and hard" ring X highly pre-tightened will be preferred to a "thick and soft" ring Y which is slightly pre-tightened: the rings X and Y whose characteristics follow will result in the same bearing pressure in operation ($\Delta T = 50°$ C.):

$P_X = 2 \cdot 0.01 \cdot 2,200,000 (0.0045 + 50 \times 10^{-5}) =$
$P_Y = 2 \cdot 0.02 \cdot 2,200,000 (0.002 + 50 \times 10^{-5}) = 220 \text{ bars}$

|  | $t/D = 0.01$ |  | $t/D = 0.02$ |
|---|---|---|---|
| ring | $s = 0.0045$ | ring | $s = 0.0020$ |
| X | $\sigma_{el} = 120$ hbars | Y | $\sigma_{el} = 60$ hbars |
|  | $\sigma_X = 110$ hbars |  | $\sigma_Y = 55$ hbars. |

On the other hand, the thin ring X will withstand, with no permanent deformation, larger defects in the geometry of the bore of the cylinder. Indeed, the ring X will maintain the ring-cylinder contact despite a divergence of the cylinder of 0.0045—i.e. 0.6 mm of diameter—whereas the ring Y will only be able to compensate for divergences of 0.002—i.e . 0.26 mm.

Preferably, the cylindrical part of height H of the ring is followed and/or preceded, in the axial direction, by a leading part of substantially frustoconical shape, which will taper in the direction away from this cylindrical part, this or these leading parts having for effect to facilitate the formation of said film of oil.

If the height H is too small, the hydrodynamic support of the ring will be insufficient and the film of oil will be too thin, which is liable to result in a wear of the ring. The higher the ring the better the conditions o lubrication, but the greater the friction. A good compromise between these two requirements may be found at around 10 mm for this height H, irrespective of the dimensions of the piston.

According to a first improvement, an object of the invention is to improve the seal, in its cylinder, of the piston whose essential characteristics have been defined hereinbefore.

The phenomena involved in the interface between the ring and the guiding cylinder depend on the surface conditions and their physico-chemical structure, on the quantity of oil present or on the local thickness of the film, on the local pressure of contact, on the velocity of displacement of a surface relative to another, on the conditions at the limits of interface, i.e. on the pressure of the gases below the ring.

Two conditions of operation are to be considered:

1. There is a metal-to-metal contact and the wear and the losses due to friction are substantial and increase in the same direction as the contact pressure (coefficient of friction on the odder of 5 to 15% depending on the surface treatments).

2. There is no metal-to-metal contact and the ring slides on a film of oil whose thickness depends on the contact pressure, the geometry of the ring, the velocity and the pressures above and below the ring. In this second case, wear is very low, the coefficient of friction being divided by about 100.

During an engine cycle, the conventional piston ring arrangement operates partly in mode 2 during the low pressure phases of the cycle and partly in mode 1 in the high pressure phase of the cycle, which results in wear and limitation of the maximum pressures since the contact pressures follow the pressure of the gases (which may reach several hundreds of bars), the piston ring arrangement being pressure-sealed.

The aforementioned improvement has for object to remain essentially in mode 2.

For this purpose, said connecting means between the ring and the body of the piston advantageously include a sealing device so arranged as to prevent practically any passage of gaseous fluid between the inner surface of the ring and the outer surface of the body of the piston.

Preferably, said sealing device is so arranged as to ensure the seal in a plane which is transverse to the axis of the piston and passes substantially through the upper edge of said cylindrical bearing portion of height H. In this way, any disadvantageous effect due to the pressure of the gases is avoided.

Indeed, if the seal were ensured above the edge, there would be produced an "anti-pressure-sealed" effect which is by nature divergent:

Indeed, in this situation, the pressure of the gases has a tendency to move the ring away from the inner wall of the cylinder (as shown by the diagram of FIG. 7) and consequently to lower still further the upper edge of the cylindrical bearing portion and therefore to increase the anti-pressure-sealed effect until there is a complete detachment of the ring and a loss of the seal.

If the seal were ensured below said edge, there would on the other hand be produced a "pressure-sealed" effect which would have the double drawback of depending on the pressure of the gases and therefore on the operation of the engine, and of, moreover, increasing the bearing pressure and therefore the friction of the ring on the cylinder, thereby accelerating the wear of the ring and cylinder.

According to a second improvement, an object of the invention is to limit the flow of oil from one side of the piston to the other.

The consumption of oil is in itself costly. Moreover, the rising of the oil to the combustion chamber results in the formation of lac, soot and calamine which are deposited on the piston head, but also on the top of the cylinder, in particular on the sliding path of the ring, which may in the long run cause scratching of the ring and a loss of the seal which worsens the defect.

A better understanding of the mechanism of the limitation of the oil flow will be had from the following description (see FIG. 8):

The upper part of the ring communicates with the gases under pressure.

The lower part communicates with the oil sump and is in contact with the oil brought thereto.

The sealing borderline of the ring is located at the level of the upper edge of the cylindrical bearing portion of the ring.

The cylindrical bearing portion is upwardly extended by a leading portion of substantially frustoconical shape which tapers in the direction away from the cylindrical bearing portion. The angle of the truncated cone is usually less than 1°. The truncated cone may extend through a height of about 5 mm.

The cylindrical bearing portion terminates in its lower part in a chamfer.

In the course of the rising stroke of the piston, an oil wedge is formed between the cylinder and the leading portion of the ring: a dynamic pressure is developed which has a tendency to separate the ring from the cylinder. At the same time, the pressure of the gases—which increases with the extent of the stroke—downwardly expels a certain quantity of oil.

In the neighbourhood of top dead center, the support resulting from the hydrodynamic pressure in the film of oil, is cancelled out, the ring is decompressed and the thickness of the film of oil is reduced, which has a tendency to expel the oil on each side of the ring (it will be recalled that the pressure of the gases has no effect on the compression of the ring).

In the course of the descending stroke of the piston, the lower edge of the ring has a tendency to downwardly scrape the oil existing on the cylinder below the ring.

Let it be assumed that the effectiveness of this scraping is perfect: sharp edge or elastic lip, etc.

In this case, no amount of oil will pass through the ring, in particlar for compensating the amount of oil which had been downwardly expelled in the vicinity of top dead center.

There will be a progressive drying of the upper part of the ring which in the end will cause wear and the loss of the seal produced by the ring-cylinder assembly.

The lower edge of the ring will therefore have to have a chamfer which is sufficiently large to enable a small amount of oil to pass through the ring during the descending stroke of the piston and replace the amount of oil which was downwardly expelled during the rising stroke of the piston and more particularly around top dead center.

By means of this double-acting pumping of the oil, an equilibrium may be reached which thus limits the rising, and therefore the consumption, of the oil but also prevents the drying of the bearing portion of the ring.

Further, in order to ensure that the quantity of oil upwardly expelled during the rising stroke of the piston, and more particularly around top dead center, does not enter the combustion chamber and be dispersed and finally burnt therein, it is preferable to arrange that the space between the piston and the liner above the upper edge of the cylindrical bearing portion of the ring have a volume which is greater than that of the raised oil.

There may also be advantageously employed fine helical grooves in the wall of the cylinder (of the honing type) or even on the cylindrical bearing portion of the ring, to facilitate the downward expulsion of the raised oil by the action of the pressure of the gases. These grooves should of course be sufficiently fine so that no passage of gas may occur, bearing in mind the viscosity of the oil.

In a particularly judicious construction, said connecting means between the ring and the body of the piston include a possibility of a resilient bearing of the ring in the axial direction against an abutment integral or rigid with the piston body.

According to a third improvement, the object of the invention is to improve the guiding of the piston inside its cylinder.

For this purpose, said connecting means between the ring and the body of the piston are advantageously so arranged that they preclude practically any radial displacement of the whole of the ring relative to the body of the piston. Preferably, these means are formed by at least one, preferably continuous, web whose thickness is less than the thickness of the ring and which connects one of the upper and lower edges of the ring to the body of the piston.

As briefly recalled hereinbefore, FR-A-707.660 has already taught substituting for the conventional split piston rings a continuous metal ring, that is an unsplit ring, whose surface is cylindrical. In this document, a certain clearance is provided in the cold state between the ring and the cylinder, which results in a difficult manufacture of the ring and a very delicate adjustment of the clearance; as this adjustment moreover depends on the conditions of operation of the engine, it renders the piston non-fluidtight when starting up and when operating at low power and prevents the arrival of oil under the ring (under or not under pressure). Further, the ring is radially movable relative to the piston and this prevents the piston from being guided in the cylinder by means of the ring and precludes the positioning of the latter in a lower part of the head of the piston, the ring being therefore necessarily located in a hot, unprotected region (resulting in wear). The known ring is only slightly elastic, whereas the ring according to the invention is as thin and elastic as possible. I is therefore clear that the piston according to the invention is not only novel but involves the required inventive activity relative to the pistons of the type disclosed in FR-A-707.660.

In another of its aspects, the invention provides reciprocating machines employing a compression of gaseous fluid, in particular reciprocating internal combustion engines provided with at least one piston such as that which was defined hereinbefore or has features which will be clear from the following further description.

The invention will now be described in more detail with reference to the accompanying drawings whose figures 1, 2, 7 and 8 have already been referred to.

BRIEF DESCRIPTION OF THE DRAWINGS

FIGS. 4 to 6 each represent a variant of a part of the piston of FIG. 3.

DETAILED DESCRIPTION OF THE PREFERRED EMBODIMENTS

Figure 3:
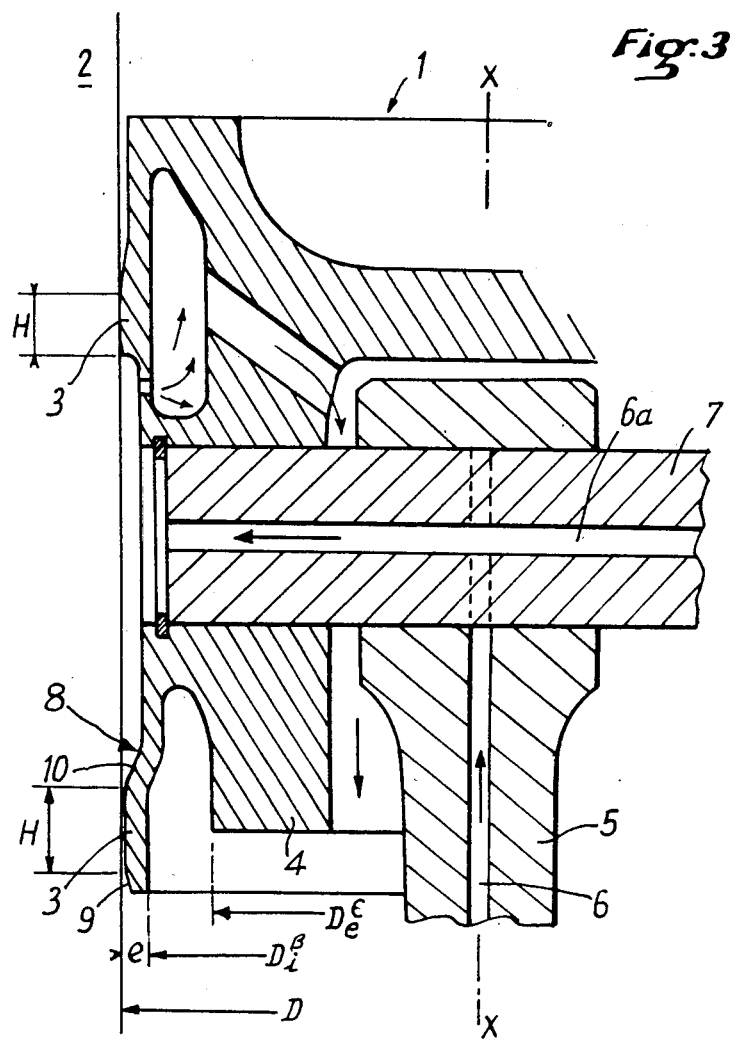
FIG. 3 is a semi-axial sectional view of a piston arranged in accordance with the invention.
Figure 2:
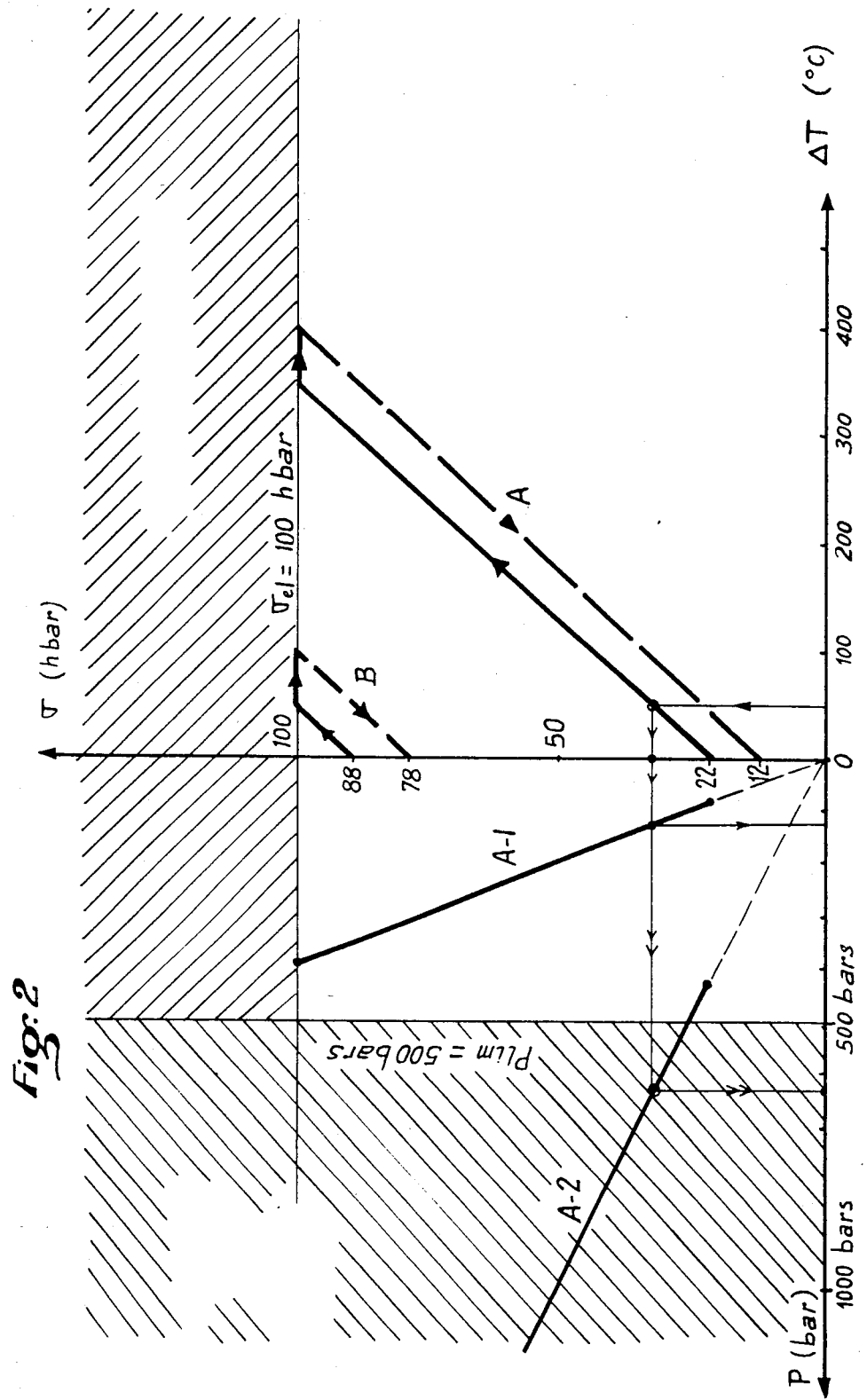
FIG. 2 is a double diagram of operation.

As is clear from FIG. 3, the invention relates to a piston 1 which is adapted to slide in a cylinder 2 and carries at least one continuous solid metal ring 3. The outer surface of each ring 3 is cylindrical in at least a part H of its height and has a generatrix parallel to the axis X—X of the piston 1. The inside diameter $D_{in}^R$ of this ring 3 is greater than the outside diameter $D_{out}^B$ of the body of the piston 4, at least in the height H confronting it. This piston 1 is provided with a connecting rod 5 and means for supplying lubricating oil coming from an oil sump (not shown). These means comprise for example a passageway 6 extending longitudinally along the connecting rod 5 and a passageway 6a extending axially along the pin 7 of the connecting rod 5. According to the embodiment shown by way of example in FIG. 3, the piston 1 has two rings 3 between which the passageway 6a opens onto the outer surface of the piston.

According to the invention, the (or each) ring 3 has, when it is not mounted in the cylinder and has the same temperature as the latter, an outside diameter which is equal to, or preferably slightly greater than (in a ratio on the order of 1.001), the inside diameter of the cylinder 2 or, when the latter is lined, the inside diameter of the liner of the cylinder 2.

The relative thickness t/D of the ring 3 (see also FIG. 1) is no more than the limit k defined hereinbefore.

Figure 1:
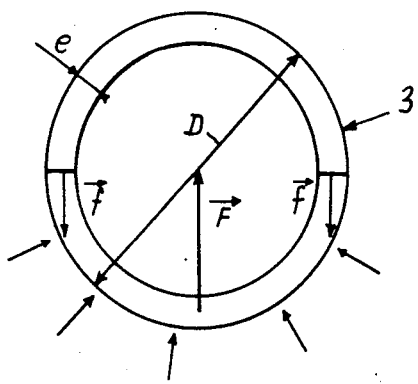
FIG. 1 of these drawings is an end elevational view of a ring according to the invention on which said forces f and F have been applied.

The ring 3 is connected to the body 4 by means 8 which will be explained in detail hereinafter and are so arranged that they can in no case result in the creation, in operation, between the ring 3 and the cylinder 2, of a pressure of contact higher than $P_{lim}$, the pressure of contact being defined hereinbefore with the aid of FIG. 1 and the pressure $P_{lim}$ being also defined hereinbefore.

The height H is sufficiently great so that there can be established, in operation, a hydrodynamic pressure which permits the creation of a sufficiently thick film of oil in cooperation with said lubricating oil supply means.

A piston constructed in this way is free from seizing phenomena, as explained hereinbefore.

The cylindrical portion of height H of the ring 3 is followed and preceded by, in the direction parallel to the axis X—X, leading portions 9, 10 of substantially frustoconical shape which taper in the direction away from this cylindrical portion, as can be seen in FIG. 3.

Preferably, the height H is on the order of 10 mm, irrespective of the dimensions of the piston and the diameter D of the ring.

As has been described hereinbefore with reference to FIG. 3, although the piston 1 is free from seizing phenomena, it is neither sealed nor suitably guided relative to the cylinder 2. The object of the improvements which will now be described is to render the piston sealed and/or to guide it relative to the cylinder 2.

To render the piston 1 solely sealed, said connecting means 8 between the ring 3 and the body 4 of the piston 1 are so arranged that they comprise a sealing device which is so adapted as to substantially prevent any passage of gaseous fluid between the inner surface of the ring 3 and the outer surface of the body 4 of the piston.

According to the embodiment shown in FIG. 4, the ring 3 is disposed in a groove 11 provided in the piston body 4 with both a radial and an axial clearance. The connecting means 8 are so arranged as to ensure the seal in a plane P which is transverse to the axis X—X of the piston, this plane substantially passing through the upper edge of the cylindrical bearing portion of height H, i.e. through the circumference of intersection between this cylindrical bearing portion and the frustoconical surface 10. These connecting means include a possibility for the ring 3 to bear elastically, in the axial direction, against an abutment integral or rigid with the piston body 4.

As an example, the sealing means 8 may be formed by a fluidtight elastic washer or ring 13 which bears, on one side, against the transverse upper side 12 of the groove 11, constituting said abutment, and, on the other side, against a shoulder 14 formed in the upper part and on the inner side of the ring 3. Tee latter can be provided with at least one transverse aperture 15 which balances the pressures between the inner and outer cylindrical surfaces of the ring 3.

For the purpose of guiding the piston 1 in translation without necessarily rendering it sealed, said connecting means 8 are so arranged that they substantially preclude any radial displacement of the whole of the ring 3 relative to the piston. As shown in FIG. 6, these means have been advantageously formed by an annular web 16 which is preferably continuous and has a thickness less than the thickness e of the ring 3 and connects to the piston body 4 one of the upper and lower edges of the ring 3, namely the lower edge in the presently-described embodiment. As can be seen, such a web 16, even if it is thin, constitutes an annular connection which is rigid in the transverse direction between the ring 3 and the piston body 4 to which it may be secured for example by welding.

FIG. 5 illustrates a combination of the arrangements represented in FIGS. 4 and 6, combining the sealing and the guiding of the piston. According to the embodiment of FIG. 5, the ring 3 is connected to the piston body 4 by a web 16 similar to that of FIG. 6 and a sealing ring 13, similar to that of FIG. 4 but having no need to exert an axial thrust on the ring 3, is interposed between a shoulder 4, similar t that of FIG. 4, and a transverse surface 12 similar to that of FIG. 4 but not pertaining to a groove such as groove 11.

In the embodiments of FIGS. 5 and 6, at least one aperture 15, similar to that of FIG. 4, is advantageously provided.

Figure 7:
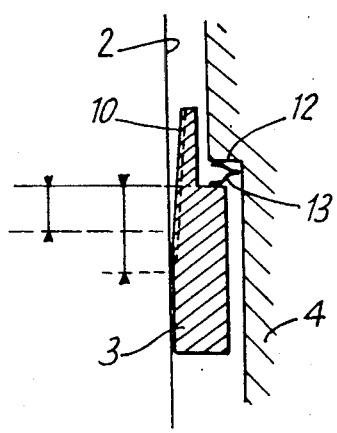
FIG. 7 is an extract from FIG. 4 in which the position of the upper edge of the cylindrical bearing portion of the ring has been modified.

FIG. 7, to which reference was made hereinbefore, shows the effect of the position of the upper edge of the cylindrical bearing portion of height H relative to the transverse plane P where the seal is provided.

Figure 8:
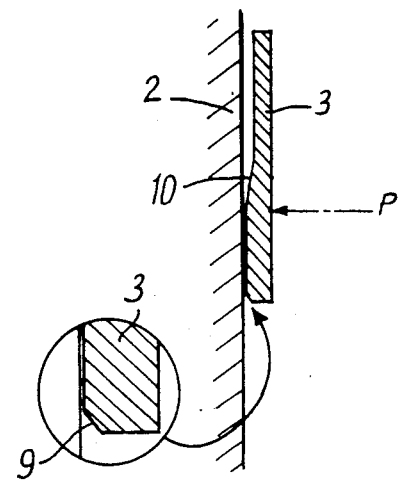
FIG. 8 is a diagram illustrating the foregoing description with a local magnification within a circle.

FIG. 8, to which reference was also made hereinbefore, illustrates the mechanism of the limitation of the oil flow.

Figure 9:
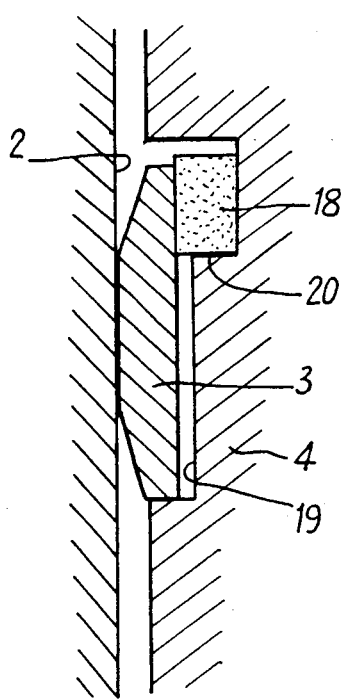
FIGS. 9 and 10 each illustrate another variant of the selling means.
Figure 10:
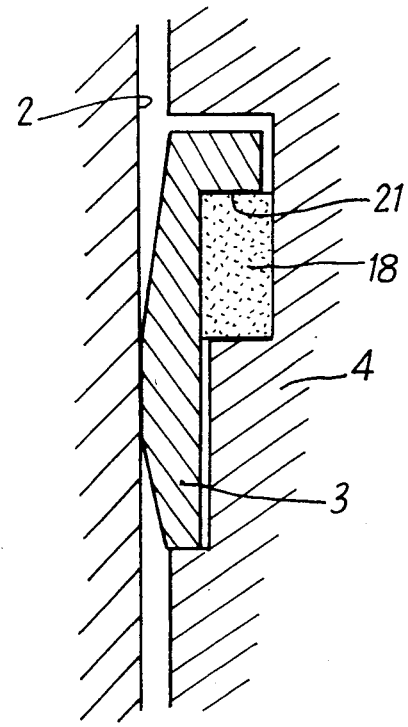

In the variant of FIGS. 9 and 10, said sealing device is constituted by a ring of deformable and incompressible material 18 interposed between the ring 3 and the piston body 4. Preferably, this material is based on polytetrafluorethylene ("Teflon").

In FIG. 9, the ring 18 is adhered to the cylindrical inner surface of the ring 3 and the unit formed thereby is disposed in a groove 19 which differs from the groove 11 in that it includes a step 20 against which the sealing ring 18 bears.

The embodiment of FIG. 10 differs from that of FIG. 9 by the presence of an inner shoulder 21 on the ring 3 for trapping the ring 18 between this shoulder and the step 20.

Whatever embodiment is adopted, the piston according to the invention is advantageously so arranged that the bearing pressure exerted by the ring 3 on the cylinder 2 reaches a value which does not exceed one third of the maximum pressure of the combustion gases.

What is claimed is:

1. A piston for a reciprocating machine employing a compression of gaseous fluid, such as an internal or external combustion engine or a compressor, which piston comprises a body, has an axis, is adapted to slide in a cylinder of said machine and carries at least one continuous solid ring of revolution—i.e. with no split—having an outer surface which is cylindrical at least in a portion H of the height of the ring and has a generatrix parallel to said axis of the piston defining a cylindrical bearing portion, the ring having an inside diameter which is greater than an outside diameter of said body at least at every point of said height H of the cylindrical bearing portion confronting it, irrespective of the conditions of operation of said piston, and which includes means for supplying lubricating oil, wherein:
   (a) the ring has, when it is not mounted in said cylinder and has the same temperature as said cylinder, an outside diameter equal to at least the inside diameter of the cylinder in a ratio substantially equal to 1.001;
   (b) the ratio t/D of the maximum thickness t of the ring relative to the diameter D of the ring is, at every point of said height H, at the most equal to a limit $k=P_{lim}/2\sigma_{el}$, in which $P_{lim}$ is the minimum pressure of contact of the ring on the cylinder above which pressure seizing may occur, and $\sigma_{el}$ is the elastic limit of the material of said ring;
   (c) means are provided for connecting said ring to said piston body which are so adapted that said means can in no case result in creation, in operation, between said ring and said cylinder, of a pressure of contact higher than $P_{lim}$; and
   (d) the height H is sufficiently great to enable, in operation, the establishment between said ring and said cylinder of a hydrodynamic pressure permitting the creation of a sufficiently thick film of oil.

2. A piston according to claim 1, wherein said ring is metallic.

3. A piston according to claim 1, in combination with an oil sump for supplying said lubricating oil to said lubricating oil supply means.

4. A piston according to claim 1, wherein said ring has a diameter slightly greater than the inside diameter of said cylinder.

5. A piston according to claim 1, wherein said cylindrical portion of height H of said ring is axially adjacent to at least one leading portion which has a substantially frustoconical shape and tapers in a direction away from said cylindrical portion.

6. A piston according to claim 5, comprising two of said leading portions respectively located at respective ends of the piston and adjacent to said cylindrical portion.

7. A piston according to claim 1, wherein said height H of said cylindrical portion of said ring is on the order of 10 mm.

8. A piston according to claim 1, wherein said connecting means between said ring and said body are so adapted as to substantially preclude any radial displacement of the whole of said ring relative to said body.

9. A piston according to claim 8, wherein said ring has an upper edge and a lower edge and said connecting means comprise at least one web which connects one of said edges to said body of said piston.

10. A piston according to claim 9, wherein said web is continuous.

11. A piston according to claim 9, wherein said web has a thickness less than the thickness of said ring.

12. A piston according to claim 1, so adapted that said ring bears against said cylinder at a pressure which reaches a value which does not exceed one third of the maximum pressure of combustion gases in said cylinder.

13. A piston according to claim 1, wherein said ring has an inner surface and said body has an outer surface, and said connecting means between said ring and said piston body comprise a sealing device which is so adapted as to substantially prevent any passage of gaseous fluid between said inner surface of said ring and said outer surface of said body.

14. A piston according to claim 13, wherein said sealing device comprises a ring of deformable and incompressible material interposed between said solid ring and said body.

15. A piston according to claim 14, wherein said deformable ring is made from a material based on polytetrafluoroethylene.

16. A piston according to claim 15, wherein said cylindrical bearing portion of said solid ring has an upper edge and said sealing device is so adapted as to ensure a seal in a plane which is transverse to said axis of said piston and substantially passes through said upper edge of said cylindrical bearing portion.

17. A piston according to claim 13, comprising an abutment rigid with said body of said piston, said connecting means comprising means allowing an elastic bearing of said ring against said abutment axially of said piston.

18. A piston according to claim 13, wherein said solid ring has an upper edge and a lower edge and defines with said sealing ring a space therebetween, and said connecting means comprise at least one web which connects one of said edges to said piston body, and said connecting means are so adapted as to substantially preclude any radial displacement of the whole of said ring relative to said piston body, and said means supplying lubricating oil open onto said space between said sealing ring and said solid ring and passage means are provided for putting said space in communication with an oil sump.

19. A reciprocating machine employing a compression of gaseous fluid, in particular a reciprocating internal combustion engine, comprising at least one cylinder, and at least one piston which comprises a body and has an axis and is adapted to slide in said cylinder and carries at least one continuous, solid ring of revolution—i.e. with no split—having an outer surface which is cylindrical at least in a portion H of the height of said ring and has a generatrix parallel to said axis of said piston which defines a cylindrical bearing portion, said ring having an inside diameter which is greater than an outside diameter of said body at least at every point of said height H of the cylindrical bearing portion confronting it, irrespective of the conditions of operation of said piston, said piston including lubricating oil supply means, wherein:

(a) said ring has, ween it is not mounted in said cylinder and has the same temperature as said cylinder, an outside diameter equal to at least the inside diameter of said cylinder in a ratio substantially equal to 1.001;

(b) the ratio t/D of the maximum thickness t of the ring relative to the diameter D of the ring is, at every point of said height H, at the most equal to a limit $k = P_{lim}/2\sigma_{el}$, in which $P_{lim}$ is the minimum pressure of contact of said ring on said cylinder above which pressure seizing may occur, and $\sigma_{el}$ is the elastic limit of the material of said ring;

(c) means are provided for connecting said ring to said piston body and are so adapted that said means can in no case result in the creation, in operation, between said ring and said cylinder, of a pressure of contact higher than $P_{lim}$; and (d) the height H is sufficiently great to enable, in operation, the establishment, between said ring and said cylinder, of a hydrodynamic pressure permitting the creation of a sufficiently thick film of oil.

* * * * *